(12) United States Patent
Kato (10) Patent No.: US 7,253,839 B2
(45) Date of Patent: Aug. 7, 2007

(54) ELECTRONIC CAMERA

(75) Inventor: Koji Kato, Tama (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 11/369,581

(22) Filed: Mar. 7, 2006

(65) Prior Publication Data

US 2006/0146176 A1   Jul. 6, 2006

Related U.S. Application Data

(62) Division of application No. 09/837,357, filed on Apr. 18, 2001, now abandoned.

(30) Foreign Application Priority Data

| Apr. 24, 2000 | (JP) | ............................. 2000-123102 |
| May 1, 2000 | (JP) | ............................. 2000-132672 |

(51) Int. Cl.
*H04N 5/225* (2006.01)

(52) U.S. Cl. .................. 348/373; 348/374; 348/375

(58) Field of Classification Search .................. None
See application file for complete search history.

(56) References Cited

U.S. PATENT DOCUMENTS

| 5,008,757 A | 4/1991 | Kimura et al. |
| 5,481,324 A * | 1/1996 | Sekine ................... 396/354 |
| 5,822,629 A | 10/1998 | O'Brien |
| 6,031,998 A | 2/2000 | Shono |
| 2005/0041137 A1 | 2/2005 | Ezawa et al. |

FOREIGN PATENT DOCUMENTS

| JP | 11088733 A * | 3/1999 |
| JP | 11-109203 A | 4/1999 |
| JP | 11-122542 A | 4/1999 |
| JP | 11-218838 A | 8/1999 |

* cited by examiner

*Primary Examiner*—Lin Ye
*Assistant Examiner*—Yogesh Aggarwal
(74) *Attorney, Agent, or Firm*—Frishauf, Holtz, Goodman & Chick, P.C.

(57) ABSTRACT

A photographic lens system for forming an object image is placed in the lens barrel of an electronic camera. In a camera body, a beam splitter for forming branched optical paths and an image sensing element for photoelectrically converting the formed object image are arranged. An optical filter attached to a filter cap is inserted between the beam splitter and the image sensing element. The filter cap intimately contacts with the perimeter of the exit surface of the beam splitter and the perimeter of the image sensing surface of the image sensing element, thereby forming closed spaces, between the optical filter and the beam splitter and between the optical filter and the image sensing element, which allow incident light to pass through.

5 Claims, 12 Drawing Sheets

ELECTRONIC CAMERA

CROSS-REFERENCE TO RELATED APPLICATIONS

The present application is a Divisional application of U.S. application Ser. No. 09/837,357, filed Apr. 18, 2001, now abandoned, which is based upon and claims the benefit of priority from the prior Japanese Patent Applications No. 2000-123102, Apr. 24, 2000, and 2000-132672, May 1, 2000, the entire contents of both of which are incorporated herein by reference.

BACKGROUND OF THE INVENTION

The present invention relates to an electronic camera and, more particularly, to an electronic camera capable of preventing deterioration of the picture quality and deterioration of the quality of a finder image caused by adhesion of dust, and at the same time allowing easy replacement/disassembly of optical members.

In an electronic camera, if dust adheres to an optical-member through which incident light to an image sensing element passes, a photographed picture is influenced by the dust. When this is the case, it is highly likely that even rubbish of a very small size, i.e., dust, which is not a problem in a silver halide camera, appears as a black dot on a photographed frame and deteriorates the picture quality. This is mainly because the size of the image sensing surface of an image sensing element is smaller than that of a silver halide film used in a silver halide camera. Adhesion of dust to optical members is particularly a big problem for an image sensing element having a high pixel density (multiple pixels), because such an image sensing element is required to have a high picture quality.

In addition, the zoom magnification at the focusing plane of an optical finder of an electronic camera is larger than that of a silver halide camera. Therefore, even rubbish of a very small size, i.e., dust, which is of no problem in a silver halide camera is highly likely to appear as a black dot in a finder field and deteriorate the quality of a finder image.

To solve these problems, in a digital still camera disclosed in Jpn. Pat. Appln. KOKAI Publication No. 11-109203, a lens and an optical filter are fixed in a sealed state in a cylindrical sealing member, and this cylindrical sealing member is attached to a substrate for mounting an image sensing element so as to cover this image sensing element tightly. That is, in this camera, a closed space is formed between the lens and the optical filter through which incident light to the image sensing element passes, and around the image sensing element. This prevents deterioration of the picture quality caused by adhesion of dust.

In this digital still camera disclosed in Jpn. Pat. Appln. KOKAI Publication No. 11-109203, however, once a unit including the components in the cylindrical sealing member is assembled, it is not easy to disassemble the unit in order to replace the parts in the cylindrical sealing member. That is, this conventional structure in which the optical members in the vicinity of the image sensing element are covered with the sealing member to thereby prevent invasion and adhesion of dust still has antinomic problems: improving the picture quality and facilitating replacement/disassembly of optical members.

Also, a camera containing a focal-plane shutter having front and rear curtains is known as a silver halide camera (a camera using a silver halide film). Since the film surface must be shielded except during exposure in a silver halide camera, this focal-plane shutter operates as follows.

Before exposure, the front curtain is always in a shielding position, and the rear curtain is in a retraction position. By a release operation, the front curtain moves to a retraction position to uncover the film surface, and the film surface is exposed to light. After a predetermined time has elapsed, the rear curtain in the retraction position moves to shield the film surface and complete the exposure. That is, the operation timings of the front and rear curtains determine the shutter speed. When the shutter speed is low (e.g., 1/500 SEC or more), the rear curtain moves after the front curtain retracts. When the shutter speed is high, the rear curtain begins to move while the front curtain is moving. In this case, the exposure time is determined by the width (size) of a slit gap between the trailing end of the front curtain and the leading end of the rear curtain (slit shutter mode).

In an electronic camera, on the other hand, a time corresponding to the exposure time in a silver halide camera can be set by an element shutter which is defined by turn on/off of an image sensing element for photoelectric conversion, e.g., a CCD. However, even an electronic camera uses a mechanical shutter for the following reasons. First, an interlace CCD requires the operation of a mechanical shutter at the end of exposure. Second, a progressive CCD must be shielded by a mechanical shutter immediately after exposure is completed by an element shutter, in order to prevent smear (therefore, exposure is preferably terminated by a mechanical shutter).

For example, Jpn. Pat. Appln. KOKAI Publication No. 11-122542 disclosed an electronic camera containing a focal-plane shutter having only one of front and rear curtains. Also, Jpn. Pat. Appln. KOKAI Publication No. 11-218838 disclosed an electronic camera containing a focal-plane shutter having a large number of sectors functioning as a shutter which also serves as a stop. The latter publication also describes that a focal-plane shutter having front and rear curtains is also usable.

In an electronic camera containing the conventional focal-plane shutter, e.g., in each of the electronic cameras disclosed in the above two publications, the shutter is placed closely in front of a CCD. This is so because the role of the focal-plane shutter is to shield the image sensing surface of the CCD. This similarly holds for a silver halide camera.

The focal-plane shutter operates a considerable number of times at high speed. Therefore, wear caused by contact of the sectors produces wear dust. In a silver halide camera, deterioration of the picture quality caused by this wear dust is hardly a problem because the size of a silver halide film is large. However, as described previously, if wear dust adheres to the cover glass of a CCD in an electronic camera, this adhered wear dust appears as a black dot in a photographed frame and deteriorates the picture quality. The reasons are, for example, that the image sensing surface of a CCD is much smaller than a silver halide film, and the cover glass is very close to the image sensing surface.

BRIEF SUMMARY OF THE INVENTION

The present invention has been made in consideration of these problems of the prior art, and has as its object to provide an electronic camera capable of preventing deterioration of the picture quality caused by adhesion of dust to optical members through which incident light to an image sensing element passes, and at the same time allowing easy replacement/disassembly of these optical members.

It is another object of the present invention to provide an electronic camera capable of preventing deterioration of the quality of a finder image or the like caused by adhesion of dust to optical members through which incident light to an optical finder unit or the like passes, and at the same time allowing easy replacement/disassembly of these optical members.

It is still another object of the present invention to prevent deterioration of the picture quality caused by wear dust produced by a focal-plane shutter, in an electronic camera containing the focal-plane shutter.

According to a first aspect of the present invention, there is provided an electronic camera comprising a photographic lens configure to form an object image, an image sensing element configured to photoelectrically convert the formed object image, a light guiding device configured to guide incident light from an object, which is incident from the photographic lens, to a first optical path to the image sensing element and a second optical path different from the first optical path, an optical filter disposed between the light guiding device and the image sensing element, and a filter holding member made of an elastic material to hold the optical filter, the filter holding member comprising a first portion that surrounds and holds an outer-diameter portion of the optical filter, and a second portion that forms a closed space between the optical filter and the light guiding device, and the second portion being connected to the first portion and intimately contacting with that surface of the light guiding device, which faces the optical filter, so as to surround the first optical path.

According to a second aspect of the present invention, there is provided an electronic camera comprising a photographic lens configure to form an object image, an image sensing element configured to photoelectrically convert the formed object image, a light guiding device configured to guide incident light from an object, which is incident from the photographic lens, to a first optical path to the image sensing element and a second optical path different from the first optical path, an optical member disposed on the second optical path in the vicinity of the light guiding device, and an elastic member configured to form a closed space between the optical member and the light guiding device, the elastic member intimately contacting with opposite surfaces of the optical member and the light guiding device and surrounding a space between the opposite surfaces so as to surround the second optical path.

According to a third aspect of the present invention, there is provided an electronic camera comprising a photographic lens configure to form an object image, an image sensing element configured to photoelectrically convert the formed object image, an optical filter disposed between the photographic lens and the image sensing element, a focal-plane shutter disposed between the photographic lens and the optical filter to mechanically interrupt incident light to the image sensing element, and a holding frame configured to surround the image sensing element and the optical filter and to form a closed space between the image sensing element and the optical filter.

According to a fourth aspect of the present invention, there is provided an electronic camera comprising a photographic lens configure to form an object image, an image sensing element configured to photoelectrically convert the formed object image, an optical filter disposed between the photographic lens and the image sensing element, a light guiding device disposed between the photographic lens and the optical filter to guide incident light from an object, which is incident from the photographic lens, to a first optical path to the image sensing element and a second optical path different from the first optical path, a focal-plane shutter disposed between the photographic lens and the light guiding device to mechanically interrupt incident light to the image sensing element, and a holding frame configured to surround the image sensing element and the optical filter and to form a closed space between the image sensing element and the optical filter.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE INVENTION

Embodiments of the present invention will be described below with reference to the accompanying drawings. In the following explanation, the same reference numerals denote components having substantially the same functions and configurations, and a duplicate explanation will be made only where necessary.

Figure 1:
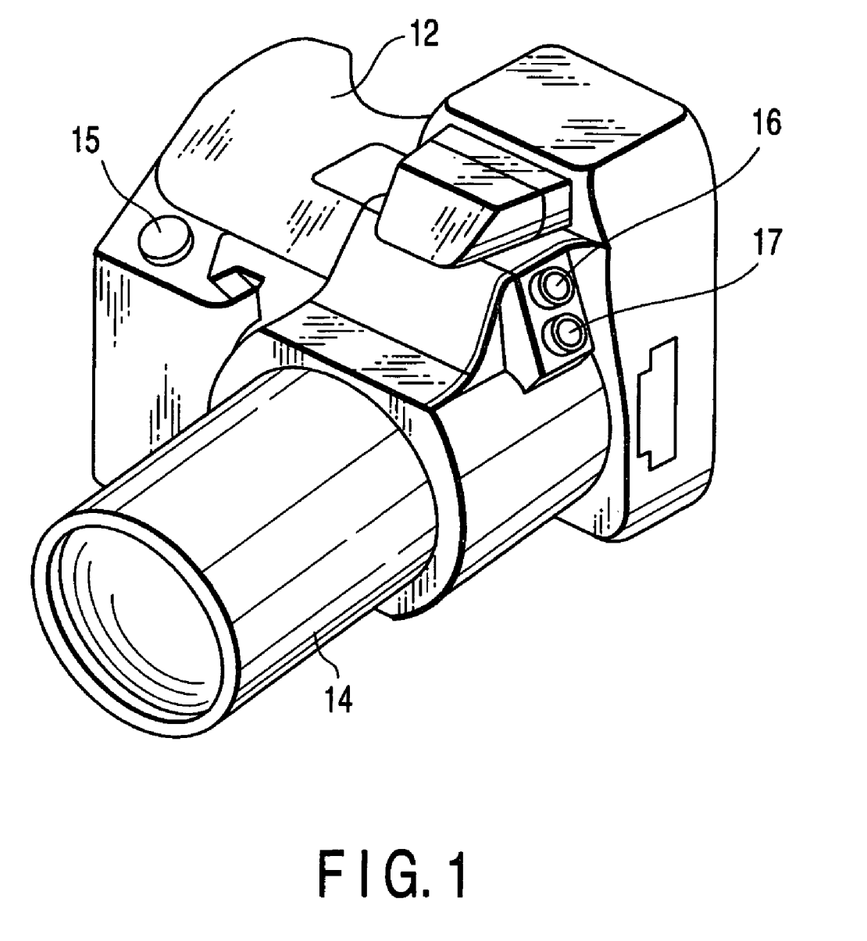
FIG. 1 is a perspective view showing the external appearance of an electronic camera according to an embodiment of the present invention.
Figure 2:
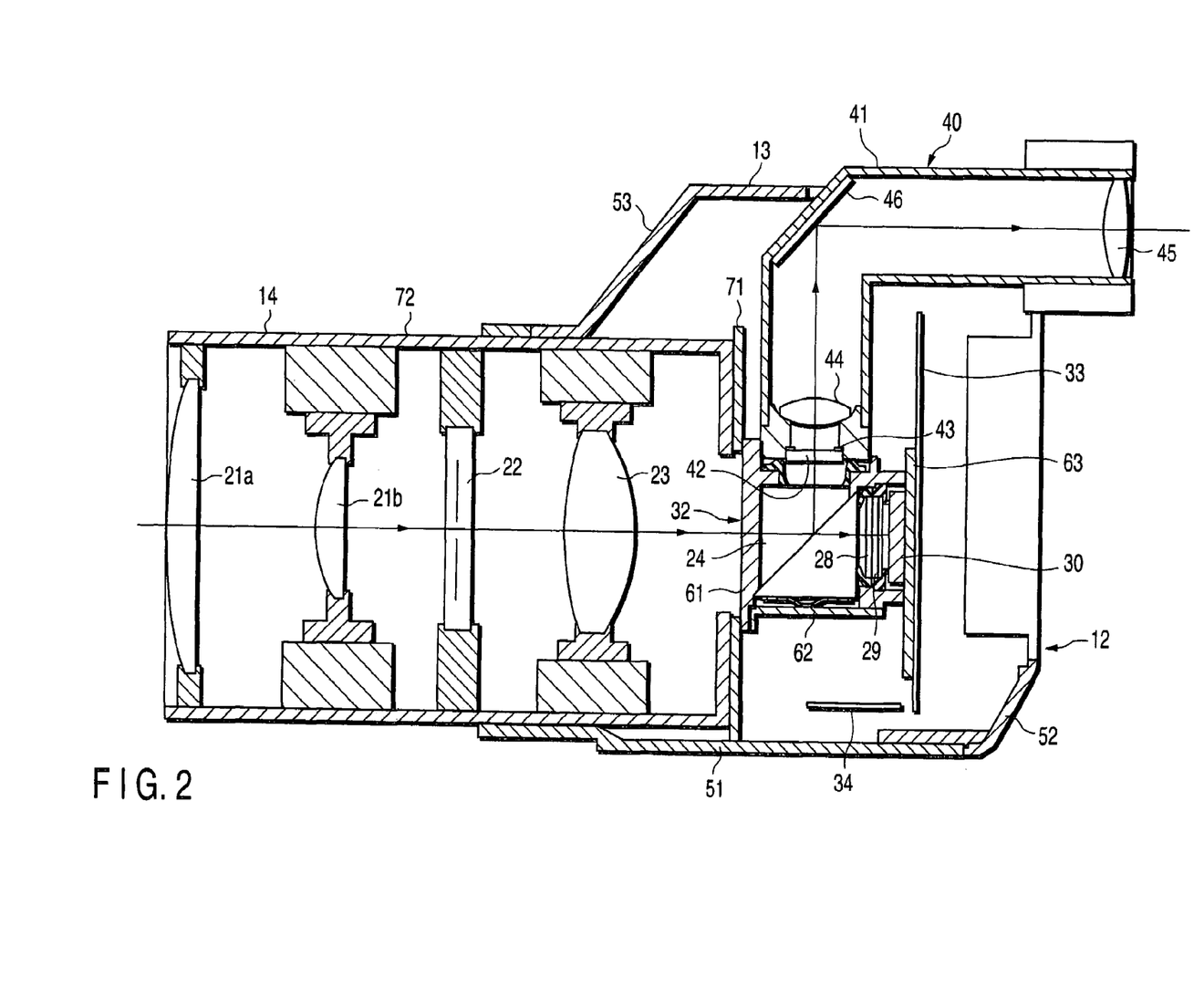
FIG. 2 is a sectional view showing the internal structure of the electronic camera shown in FIG. 1.
Figure 3:
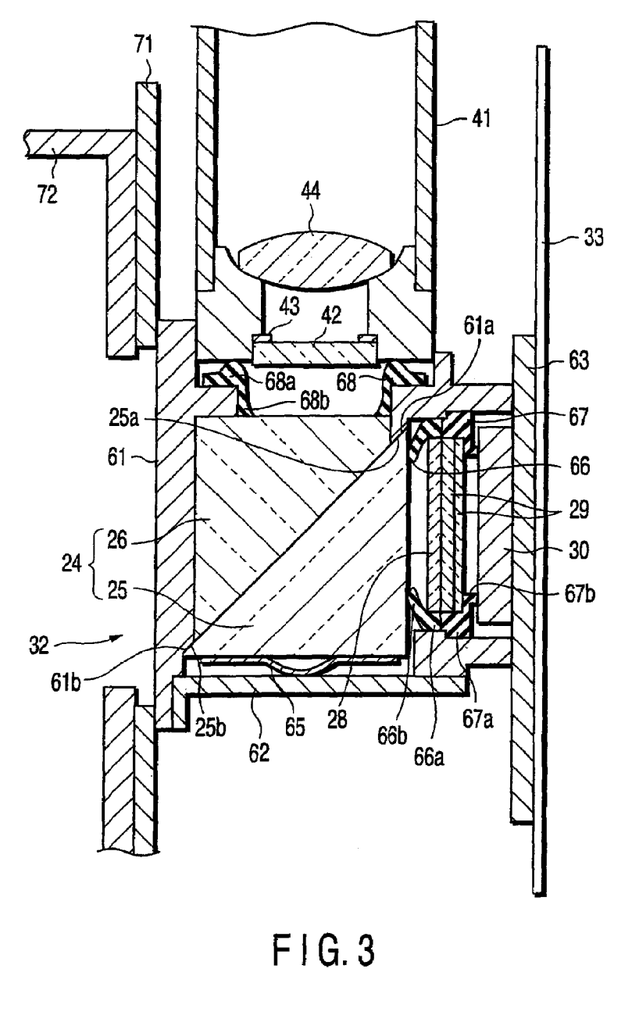
FIG. 3 is an enlarged sectional view showing the main parts of the structure shown in FIG. 2.

FIG. 1 is a perspective view showing the outer appearance of an electronic camera according to an embodiment of the present invention. FIG. 2 is a sectional view showing the internal structure of the electronic camera. FIG. 3 is an enlarged sectional view showing the main parts of the electronic camera. As shown in FIG. 1, this electronic camera 10 includes a camera body 12, and a lens barrel 14 detachably attached to the front surface of a casing 13 of the body 12. FIG. 1 also shows a two-step release switch 15 for starting photographing, and a release terminal 16 and a strobe terminal 17 for connecting lines for remotely controlling release and strobe operations.

In the lens barrel 14, zoom lenses 21a and 21b, a stop 22, and a focusing lens 23 are arranged in this order from the incident light side. The zoom lenses 21a and 21b and the focusing lens 23 construct a photographic lens system for forming an object image (in FIG. 2, the arrangement of these lenses is schematically shown).

At the entrance of the camera body 12, a beam splitter 24 (light guiding device or light splitting device) for splitting an incident optical image from the photographic lens system toward a CCD image sensing element 30 and an optical finder unit 40 is placed. This beam splitter 24 is formed by combining two prisms, i.e., lower and upper prisms 25 and 26. The CCD image sensing element (photoelectric conversion element) 30 photoelectrically converts the incident object image formed on the image sensing surface, and outputs it as an electrical signal.

Two optical filters 28 and 29 are inserted between the beam splitter 24 and the image sensing element 30. The filter 28 is an IR cut filter for cutting infrared radiation, which is formed by deposition on a glass surface. The filter 29 is a low-pass filter for preventing moire, which is formed by stacking two or more quartz plates. These filters 28 and 29 are integrated by adhesion.

The beam splitter 24, the optical filters 28 and 29, and the image sensing element 30 are installed in a form to be described later in the camera body 12 by a holding frame structure 32. A first printed circuit board 33 is placed at the back of this holding frame structure 32, and the image sensing element 30 is connected to this first printed circuit board 33. In addition, a second printed circuit board 34 is placed below the holding frame structure 32 so as to form a right angle to the first printed circuit board 33.

An optical finder unit 40 is attached to the holding frame structure 32 in accordance with the optical path branched upward by the beam splitter 24. This optical finder unit 40 includes a finder frame 41 bent at a right angle. A focusing plate 42 for focusing and a field frame plate 43 are attached to that side of the finder frame 41, which faces the beam splitter 24. In this finder frame 41, a plurality of lenses 44 and 45 and a mirror 46 are arranged (the lens arrangement is schematically shown in FIG. 2). The light beam split toward the optical finder unit 40 by the beam splitter 24 is guided to a finder window at the back of the camera body 12 via these optical members.

An image display LCD 18 is placed in the middle of the back surface of the camera body 12. This image display LCD 18 is used as a photographic finder in recording mode and as a monitor for reproducing a recorded photographed picture in playback mode.

Figure 4A:
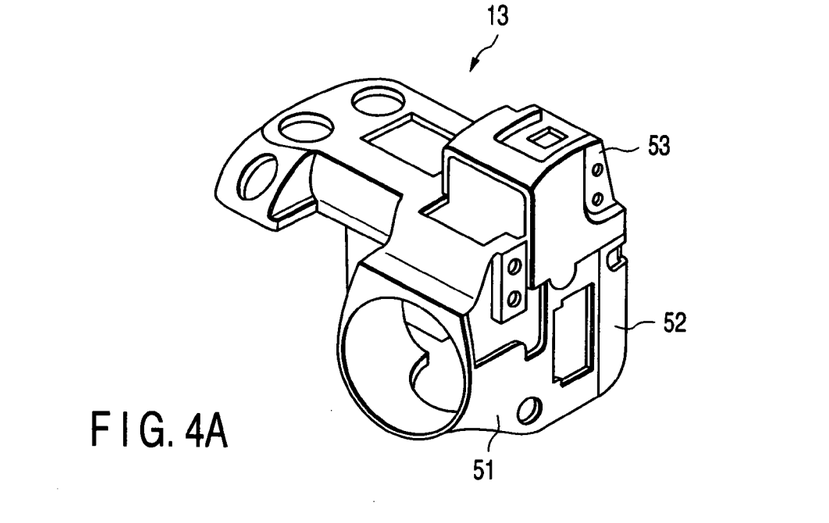
FIGS. 4A and 4B are perspective views showing the assembled state and disassembled state, respectively, of a casing used in a camera body of the electronic camera shown in FIG. 1.
Figure 4B:
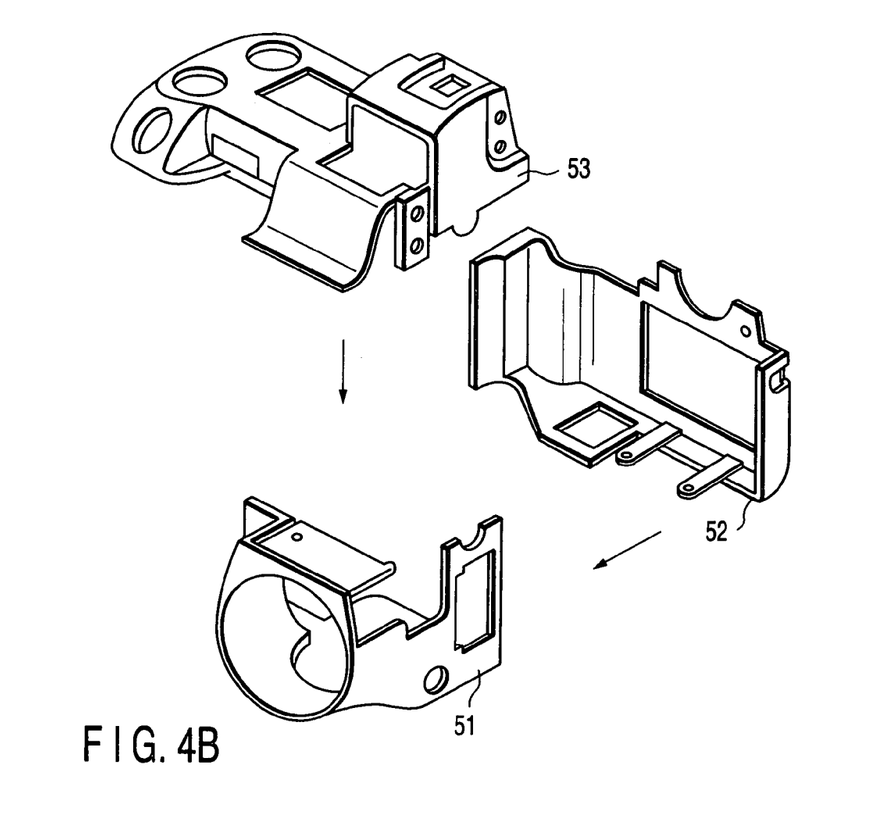

FIG. 4A is a perspective view showing the assembled state of the casing 13 of the camera body 12. FIG. 4B is a perspective view showing the disassembled state of the casing 13. As shown in FIGS. 4A and 4B, this casing 13 is composed of a front cover 51, a rear cover 52, and an upper cover 53, all of which are metal products having a high thermal conductivity, e.g., aluminum diecast products. These covers 51, 52, and 53 are joined by using known screw members (not shown). The covers 51, 52, and 53 are thermally connected as their contact surfaces intimately contact with each other, thereby constructing an integrated heat-radiating casing having large thermal capacity, i.e., the casing 13, for radiating heat to the outside of the camera.

Figure 5:
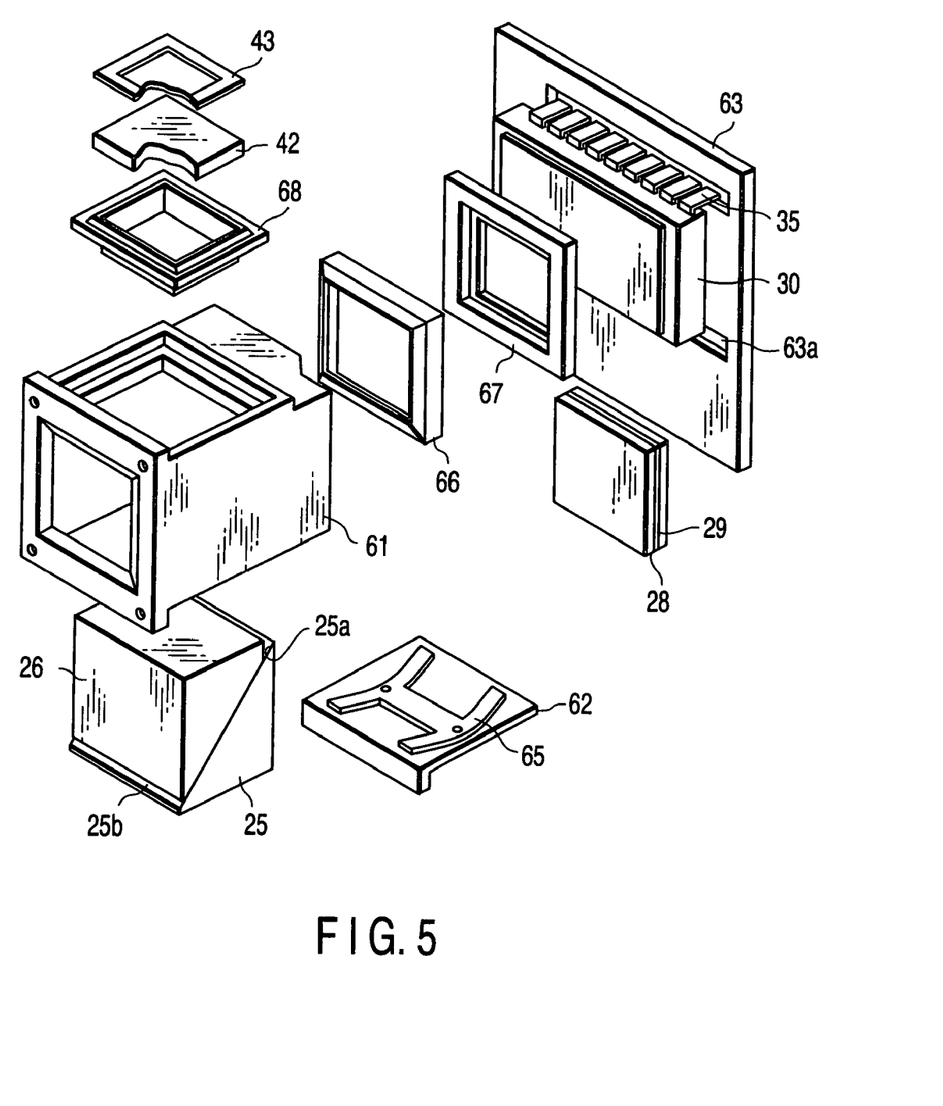
FIG. 5 is a perspective view showing the disassembled state of a holding frame structure used in the electronic camera shown in FIG. 1.

FIG. 5 is a perspective view showing the disassembled state of the holding frame structure 32. As shown in FIGS. 3 and 5, this holding frame structure 32 includes a prism frame (heat-transfer frame member) 61, a bottom plate 62, and a rear plate 63, all of which are metal products having a high thermal conductivity, e.g., aluminum diecast products. The holding frame structure 32 also includes filter caps 66 and 67 and a sealing member 68 assembled inside the prism frame 61. All of the filter caps 66 and 67 and the sealing member 68 are products made from highly elastic materials, e.g., synthetic rubber molded products.

The prism frame 61 is so constructed as to insert the beam splitter 24 from the lower opening of this prism frame 61. The bottom plate 62 is fastened to the prism frame 61 by using known screw members (not shown) so as to close this lower opening. The prism frame 61 and the bottom plate 62 are thermally connected as their contact surfaces intimately contact with each other, thereby constructing an integrated heat-transfer frame member having large thermal capacity.

On the bottom surface 62, a leaf spring 65 for pressing the beam splitter 24 in a biased state at a predetermined position is disposed. The lower prism 25 is positioned by the biasing force of this leaf spring 65. In this state, those contact surfaces 25a and 25b at the upper and lower edges of the reference oblique surface of the lower prism 25, which protrude from the upper prism 26, contact with corresponding stop surfaces 61a and 61b, respectively, formed on the prism frame 61. The upper prism 26 is positioned as it is pushed against the reference oblique surface of the lower prism 25 by the sealing member 68.

The rear plate 63 is much larger than the image sensing element 30 and intimately contacts with the rear surface of the image sensing element 30. This rear plate 63 is fastened to the prism frame 61 by using known screw members (not shown) so as to close the rear opening of the prism frame 61.

The rear plate 63 is thermally connected to the prism frame 61 as their contact surfaces intimately contact with each other, thereby forming a thick heat-transfer path from the rear plate 63 to the prism frame 61. A pair of slits 63a are formed in this rear plate 63. A lead frame 35 for electrically connecting the image sensing element 30 and the printed circuit board 33 is disposed through these slits 63a.

Figure 6:
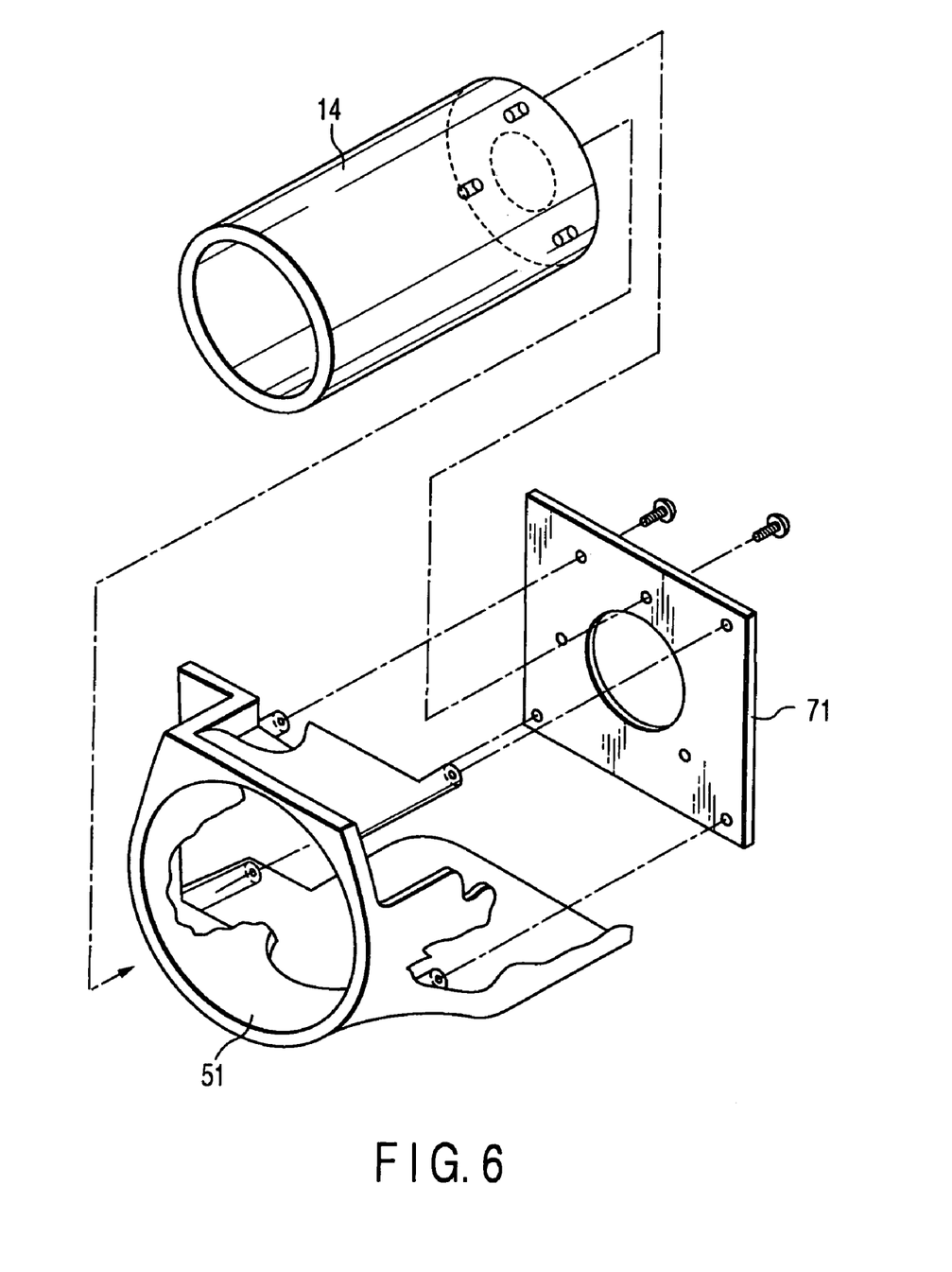
FIG. 6 is a perspective view showing the relationship between a front plate of the holding frame structure, a lens barrel, and a front cover of the casing in the electronic camera shown in FIG. 1.

As shown in FIGS. 3 and 6, the holding frame structure 32 further includes a front plate 71 placed on the front side of the prism frame 61. This front plate 71 is a metal product having a high mechanical strength and a high thermal conductivity, e.g., a steel plate product. FIG. 6 is a perspective view showing the relationship between the front plate 71 of the holding frame structure 32, the lens barrel 14, and the front cover 51 of the casing 13.

The prism frame 61 is fastened to the front plate 71 by using known screw members (not shown). This prism frame 61 is thermally connected to the front plate 71 as their contact surfaces intimately contact with each other, thereby forming a thick heat-transfer path from the prism frame 61 to the front plate 71. Furthermore, the front plate 71 is fastened to the front cover 51 of the casing 13 by using known screw members (some screw members are shown in FIG. 6). This front plate 71 is thermally connected to the front cover 51 as their contact surfaces intimately contact with each other, thereby forming a thick heat-transfer path from the front plate 71 to the front cover 51.

Also, a portion of the lens barrel 14 constructs a heat-radiating barrel 72 for radiating heat to the outside of the camera. This heat-radiating barrel 72 is made of a thermally conductive material, e.g., aluminum. The rest of the lens barrel 14 is formed with a synthetic resin. The heat-radiating barrel 72 is fastened to the front plate 71 by using known screw members (not shown). This lens barrel 72 is thermally connected to the front plate 71 as their contact surfaces intimately contact with each other, thereby forming a thick heat-transfer path from the front plate 71 to the heat-radiating barrel 72.

As described above, a thick heat-transfer path is formed from the image sensing element 30 to the casing 13 of the camera body 12 and to the heat-radiating barrel 72 of the lens barrel 14, both having large thermal capacity, via the holding frame structure 32 which includes, e.g., the prism frame 61 having large thermal capacity. Since the heat generated by the image sensing element 30 is rapidly released to the outside of the camera through this heat-transfer path, it is possible to prevent a rise of the temperature of the image sensing element 30 and thereby prevent deterioration of the picture quality. In particular, the lens barrel 14 has a large exposure area to the outside and hence has a high heat-radiating effect. Note that the members such as the prism frame 61 of the holding frame structure 32 forming the heat-transfer path and the casing 13 and the heat-radiating barrel 72 for radiating heat to the outside of the camera are all originally necessary members. Therefore, the internal structure of the apparatus can be flexibly made compact without adding any extra members.

Referring back to FIG. 5, the filter caps 66 and 67 assembled inside the prism frame 61 are separately molded products and fastened to the front and rear sides, respectively, of the integrated filters 28 and 29. These filter caps 66 and 67 are inserted, as they hold the filters 28 and 29, into the prism frame 61 from its rear opening, before the rear plate 63 is attached to the prism frame 61. The filter cap 66 is positioned by abutting it against the exit surface of the beam splitter 24. The filter cap 67 is positioned by abutting it against an internal stop surface 61c of the prism frame 61.

As shown in FIG. 3, the filter cap 66 has as its main portion a surrounding portion 66a for holding the filter 28 by surrounding it. In addition, this filter cap 66 has an extended portion 66b which intimately contacts with the perimeter of the exit surface of the beam splitter 24 by elastic deformation, thereby forming, between the filter 28 and the beam splitter 24, a substantially closed space through which incident light to the image sensing element 30 passes. Similarly, the filter cap 67 has as its main portion a surrounding portion 67a for holding the filter 29 by surrounding it. This filter cap 67 also has an extended portion 67b which intimately contacts with the perimeter of the image sensing surface of the image sensing element 30 by elastic deformation, thereby forming, between the filter 29 and the image sensing element 30, a substantially closed space through which incident light to the image sensing element 30 passes.

The beam splitter 24, the filters 28 and 29, and the image sensing element 30 are assembled against the elasticity of the filter caps 66 and 67. Consequently, the surrounding portions 66a and 67a intimately contact with the beam splitter 24 and the image sensing element 30, respectively.

Since the filter caps 66 and 67 surround the whole perimeters of the filters 28 and 29, it is possible to reliably prevent damage to the edges of these filters 28 and 29 and thereby prevent the generation of particles. Also, since the filter caps 66 and 67 form a substantially closed space surrounding the optical path between the beam splitter 24 and the image sensing element 30, deterioration of the picture quality caused by invasion and adhesion of dust can be prevented. Furthermore, the filter caps 66 and 67 and the sealing member 68 intimately contact only with the beam splitter 24 and the image sensing element 30. This facilitates disassembling the beam splitter 24, the filters 28 and 29, and the image sensing element 30, when any of these components is to be replaced. Although the filter caps 66 and 67 are separate members in this embodiment, they can also be an integrated member.

The sealing member 68 is attached to the upper opening of the prism frame 61 which opens to the optical finder unit 40. This sealing member 68 has a flange portion 68a in its upper portion. The sealing member 68 is positioned by clamping this flange portion 68a in an intimate contact state between the prism frame 61 and the finder frame 41. The sealing member 68 also has a cylindrical portion 68b which intimately contacts with the perimeter of the exit surface of the beam splitter 24 by elastic deformation, thereby forming, between the focusing plate 42 and the beam splitter 24, a substantially closed space through which incident light to the optical finder unit 40 passes.

The beam splitter 24 and the finder frame 41 are assembled against the elasticity of the sealing member 68. Consequently, the sealing member 68 intimately contacts with the beam splitter 24 and the finder frame 41.

That is, a substantially closed space is also formed for the optical finder unit 40, in the vicinity of the focusing plate 42, by the sealing member 68. Therefore, deterioration of the quality of a finder image caused by invasion and adhesion of dust can be prevented. Additionally, since the sealing member 68 intimately contacts only with the beam splitter 24, disassembly of the parts around this beam splitter 24 is not interfered with.

In the above embodiment, aluminum is used as the material of the front cover 51, the rear cover 52, and the upper cover 53 of the casing 13 and the prism frame (heat-transfer frame member) 61, the bottom plate 62, and the rear plate 63 of the holding frame structure 32, from the viewpoint of thermal conductivity and light weight. However, similar effects can be obtained even when zinc or magnesium is used as the material of these parts.

Figure 7:
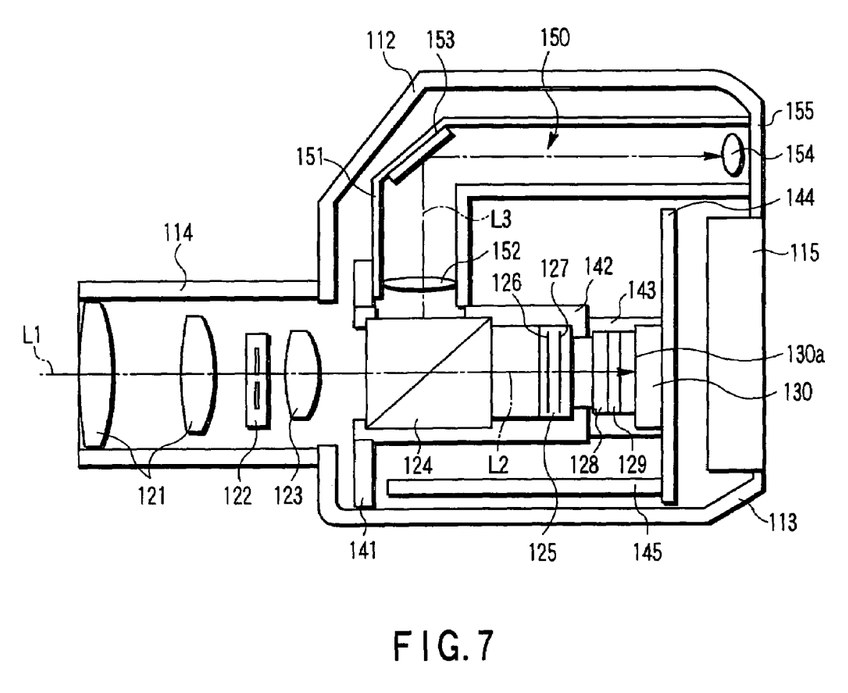
FIG. 7 is a sectional view showing the internal structure of an electronic camera according to another embodiment of the present invention.

FIG. 7 is a sectional view showing the internal structure of an electronic camera according to another embodiment of the present invention. As shown in FIG. 7, this electronic camera 110 includes a camera body 112, and a lens barrel 114 detachably attached to the front surface of a casing 113 of the body 112.

In the lens barrel 114, two zoom lenses 121, a stop 122, and a focusing lens 123 are arranged along an optical path L1 in this order from the incident light side. The two zoom lenses 121 and the focusing lens 123 construct a photographic lens system for forming an object image.

At the entrance of the camera body 112, a beam splitter 124 (light guiding device or light splitting device) for splitting an incident object image from the photographic lens system toward a CCD image sensing element 130 (an optical path L2) and an optical finder unit 150 (an optical path L3) is placed. Between this beam splitter 124 and the image sensing element 130, a shutter 125 and two types of optical filters 128 and 129 are arranged along the optical path L2.

The shutter 125 is a focal-plane shutter having a front curtain 126 and a rear curtain 127 to be opened and closed in a way to be described later. The filter 128 is an IR cut filter for cutting infrared radiation. The filter 129 is a low-pass filter for preventing the generation of moire. The CCD image sensing element (photoelectric conversion element) 130 photoelectrically converts an incident object image formed on an image sensing surface 130a and outputs it as an electrical signal.

The beam splitter 124 and the shutter 125 are held in a first holding frame 142. This holding frame 142 is mounted on and fixed to a mounting frame 141 which is fastened to the casing 113 of the body 112. The filters 128 and 129 are held in a second holding-frame 143. This second holding frame 143 forms a substantially closed space for preventing invasion of dust and the like, between the filter 129 and the image sensing element 130. The second holding frame 143 is mounted on and fixed to the first holding frame 142.

A first printed circuit board 144 is disposed at the end portion of the second holding frame 143. The image sensing element 130 is mounted on this first printed circuit board 144. In addition, a second printed circuit board 145 is disposed below the holding frames 142 and 143 so as to form a right angle to the first printed circuit board 144.

The optical finder unit 150 is mounted on the first holding frame 143 along the optical path L3 branched from the optical path L2 by the beam splitter 124. This optical finder unit 150 has a lens 152 and an eyepiece 154 placed at the two ends of a finder frame 151 bent at a right angle, and a mirror 153 placed in the bent portion of the finder frame 151. A light beam separated by the beam splitter 124 is guided to a finder window 155 at the back of the camera body 112 via these optical members 152, 153, and 154.

An image display LCD 115 is placed in the middle of the back surface of the camera body 112. This image display LCD 115 is used as a photographic finder in recording mode and as a monitor for reproducing a recorded photographed picture in playback mode.

As described earlier, the focal-plane shutter 125 operates a considerable number of times at high speed, so wear by contact of the sectors (the front curtain 126 and the rear curtain 127) produces wear dust. In the electronic camera 110 according to this embodiment, therefore, the shutter 125 is placed away from the image sensing element 130 and closer to the incident light side than the filters 128 and 129. In addition, the second holding frame 143 forms a substantially closed space for preventing invasion of dust and the like, between the filter 129 and the image sensing element 130. Hence, adhesion of wear dust to the cover glass of the image sensing element 130 can be prevented. Accordingly, it is possible to avoid phenomenon in which adhered wear dust appears as a black dot on the frame to deteriorate the picture quality.

Figure 8:
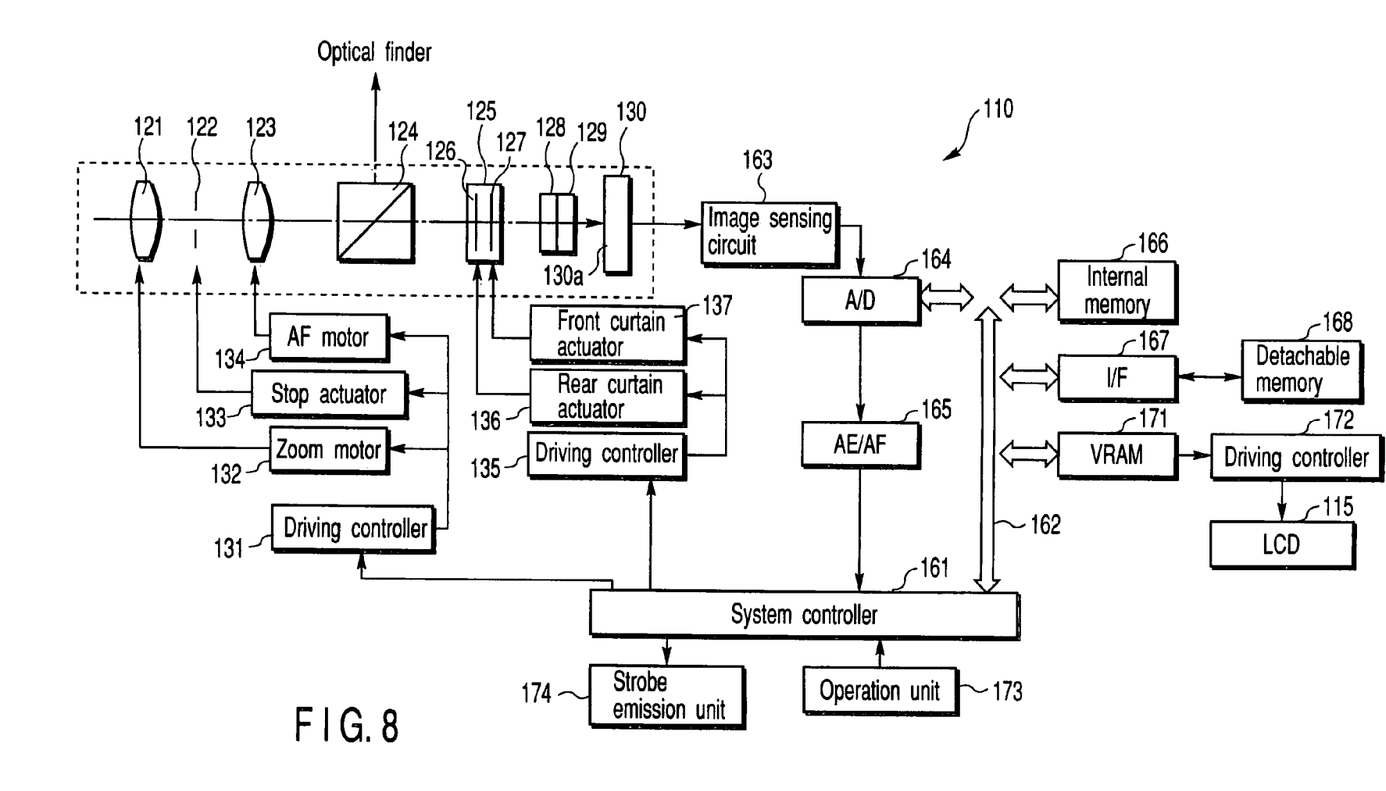
FIG. 8 is a block diagram showing the whole configuration, particularly, circuits in the electronic camera shown in FIG. 7.

FIG. 8 is a block diagram showing the overall configuration, particularly, circuits in the electronic camera 110.

An optical image of an object to be photographed is input via the photographic lens systems 121 and 123 and formed on the CCD image sensing element 130. During this image formation, in accordance with the set conditions and the photographing environment, the zoom lenses 121, the stop 122, and the focusing lens 123 are driven by a zoom motor 132, a stop actuator 133, and an AF (Automatic Focusing) motor 134, respectively, under the control of a driving controller 131. Also, the front curtain 126 and the rear curtain 127 of the shutter 125 are driven by a front curtain actuator 136 and a rear curtain actuator 137, respectively, under the control of a driving controller 135. Each of these actuators 133, 136, and 137 is a combination of a motor and solenoid.

The image sensing element 130 photoelectrically converts the incident object image formed on the image sensing surface 130a, and outputs it as an electrical signal. The signal from the image sensing element 130 is input to an A/D (analog/digital) converter 164 via an image sensing circuit 163 for signal processing. The signal from the A/D converter 164 is input to a system controller 161 via an AE (Automatic Exposure)/AF (Automatic Focusing) circuit 165, and to an internal memory 166 via a bus 162.

The internal memory 166 is connected to the system controller 161 via the bus 162. The image data stored in this internal memory 166 is compressed and recorded in a memory card 168 in a card slot via the bus 162 and an I/F (interface) 169. That is, the input image data is converted into a signal recordable in the memory card 168, under the control of the system controller 161.

The image display LCD 115 is connected to the bus 162 via a VRAM (Video RAM) 171 and a driving controller 172. The image data supplied from the image sensing element 130 or the memory card 168 and stored in the internal memory 166 is transferred to the image display LCD 115 via the driving controller 172, and displayed as an image.

An operation unit 173 is also connected to the system controller 161. This operation unit 173 includes various operation buttons and operation keys. An operation command is input to the system controller 161 via the operation unit 173 to set the operation of this electronic camera.

Furthermore, a strobe emission unit 174 including, e.g., a strobe, strobe controller, and strobe capacitor is connected to the system controller 161.

Figure 9:
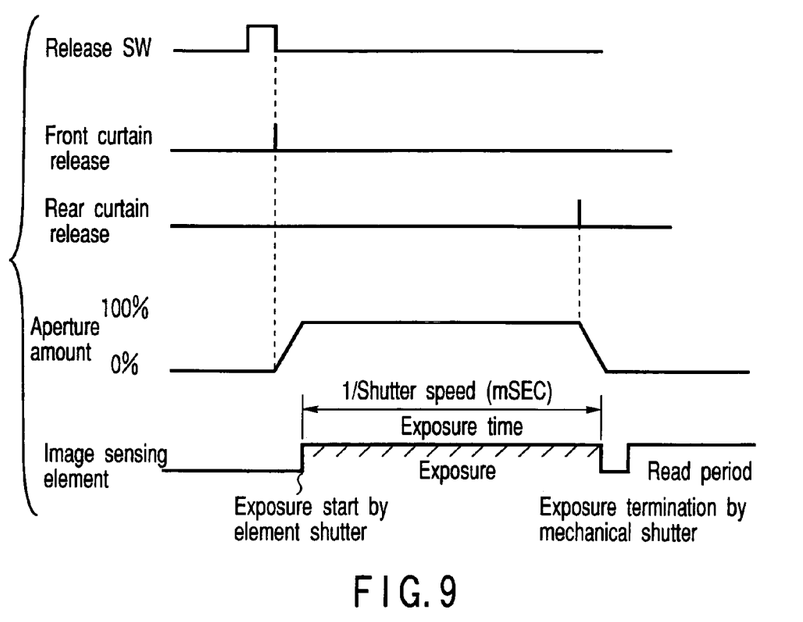
FIG. 9 is a timing chart showing the operation sequence of a shutter at a low shutter speed in the electronic camera shown in FIG. 7.

The operation of the shutter 125 performed in photographing mode of the electronic camera 110 under the control of the shutter driving controller 135 and the system controller 161 will be described in detail below. FIGS. 9 and 110 are timing charts showing the operation sequences of the shutter 125 at a low shutter speed (e.g., 1/500 msec or more) and a high shutter speed (e.g., less than 1/500 msec), respectively. FIGS. 11A and 11B are views showing the relationship between the front curtain 126, the rear curtain 127, and the image sensing surface 130a of the image sensing element 130 in a setup state and ready state common to the low and high shutter speeds. FIGS. 12A and 12B are views showing the relationship between the front curtain 126, the rear curtain 127, and the image sensing surface 130a of the image sensing element 130 at the high shutter speed.

The upper ends of the front curtain 126 and the rear curtain 127 are taken up by rolls which are driven by the motors of the actuators 136 and 137, respectively. The lower ends of these front and rear curtains 126 and 127 are taken up by rolls which are driven by springs. The front and rear curtains 126 and 127 are charged when taken up by the rollers on the motor side. When the solenoids of the actuators 136 and 137 are turned off, the front and rear curtains 126 and 127 are released and taken up by the rolls on the spring side at high speed.

In the charged state, the front curtain 126 is closed to shield the image sensing surface 130a of the image sensing element 130, and the rear curtain 127 is opened to uncover the image sensing surface 130a. In the released state, the front curtain 126 is opened to uncover the image sensing surface 130a of the image sensing element 130, and the rear curtain 127 is closed to shield the image sensing surface 130a. That is, the opening/closure of the front curtain 126 is exactly opposite to that of the rear curtain 127 in each of the charged and released states.

FIG. 11A shows the setup state initially set in photographing mode. In this state, both the front and rear curtains 126 and 127 are opened to uncover the image sensing surface 130a (the front curtain 126 is released, and the rear curtain 127 is charged). In this state, the image sensing element 130 is used to monitor the object on the image display LCD 115 or perform photometry for AE (Automatic Exposure)/AF (Automatic Focusing). FIG. 11B shows the ready state immediately before a release SW (switch) is turned on. In this state, the front curtain 126 is closed to shield the image sensing surface 130a, and the rear curtain 127 is opened to uncover the image sensing surface 130a (both the front and rear curtains 126 and 127 are charged).

As shown in FIG. 9, when the release SW is turned on from the ready state shown in FIG. 11B at the low shutter speed, the front curtain 126 is first released to uncover the image sensing surface 130a. In substantially synchronism with this, an element shutter (defined by turn on/off of the image sensing element 130) is turned on to start image sensing. When a predetermined certain image sensing time has elapsed, the rear curtain 127 is released to shield the image sensing surface 130a. After that, the signal from the image sensing element 130 is transferred and read out. That is, a time (to be referred to as an exposure time hereinafter) corresponding to the exposure time of a silver halide camera is determined by the period from the ON of the element shutter to the shielding by the mechanical shutter 125.

Figure 10:
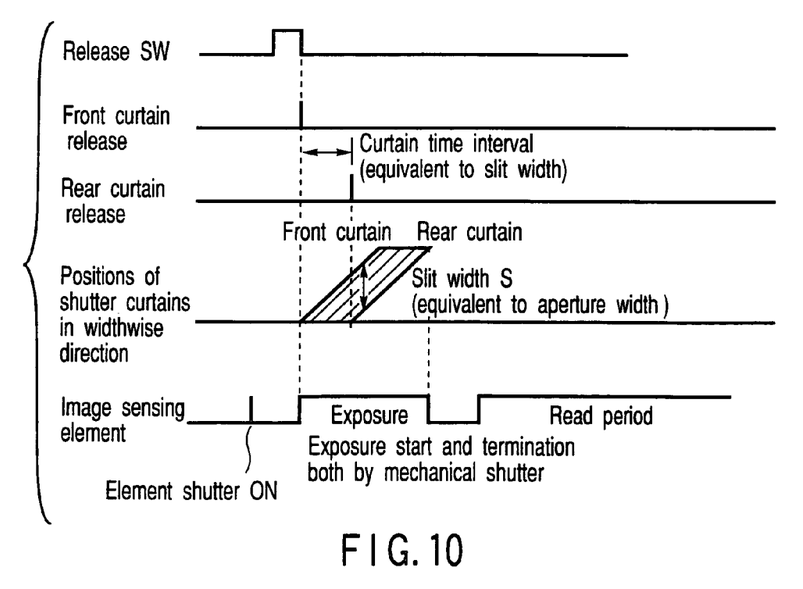
FIG. 10 is a timing chart showing the operation timing of the shutter at a high shutter speed in the electronic camera shown in FIG. 7.
Figure 11A:
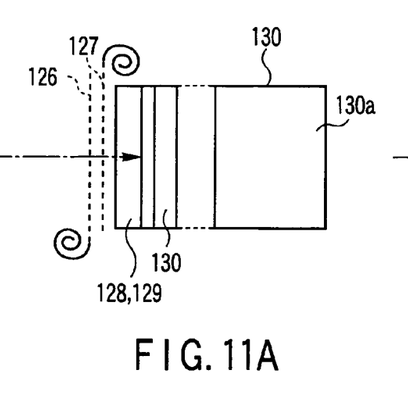
FIGS. 11A and 11B are views showing the relationship between front and rear curtains and the image sensing surface of an image sensing element in a setup state and a ready state, respectively, common to low and high shutter speeds in the electronic camera shown in FIG. 7.
Figure 11B:
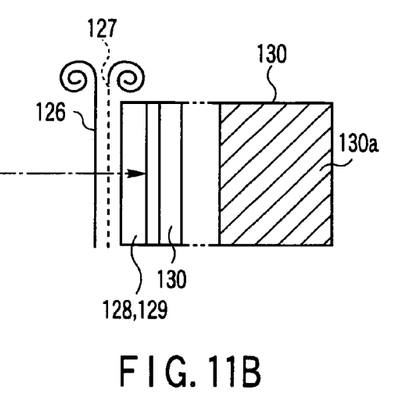
Figure 12A:
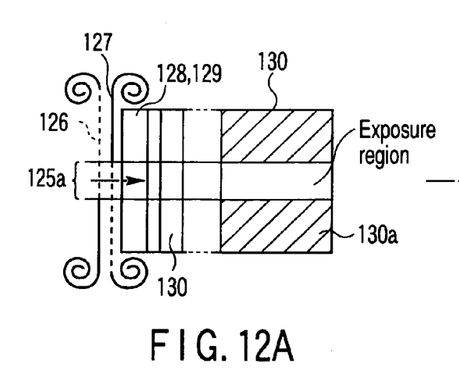
FIGS. 12A and 12B are views showing the relationship between the front and rear curtains and the image sensing surface of the image sensing element when the shutter speed is high in the electronic camera shown in FIG. 7.
Figure 12B:
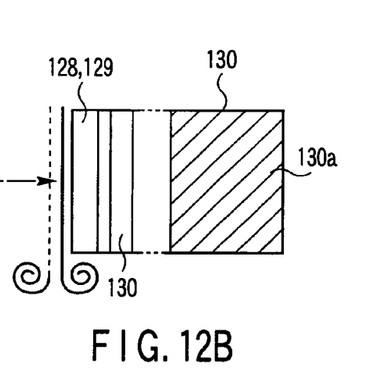

On the other hand, as shown in FIG. 10, when the shutter speed is high, the element shutter is already ON in the ready state shown in FIG. 11B. When the release SW is turned on from this ready state, the front curtain 126 is first released, and the rear curtain 127 is then released to start moving while the front curtain 126 is moving. In other words, the front and rear curtains 126 and 127 are released with a certain time lag between them and expose the image sensing surface 130a to light while running parallel to each other (FIG. 12A). When the rear curtain 127 shields the image sensing surface 130a (FIG. 12B), the exposure is complete. After that, the signal from the image sensing element 130 is transferred and read out. That is, a time (to be referred to as an exposure time hereinafter) corresponding to the exposure time of a silver halide camera is determined by the width (size) of a slit gap 125a between the trailing end of the front curtain 126 and the leading end of the rear curtain 127 (slit shutter mode).

Figure 14:
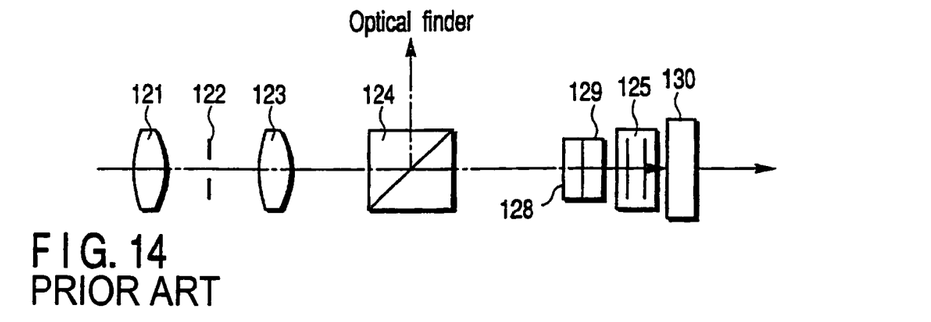
FIG. 14 is a view showing the state in which optical parts shown in FIG. 7 are arranged in accordance with the structure of a conventional electronic camera.
Figure 15:
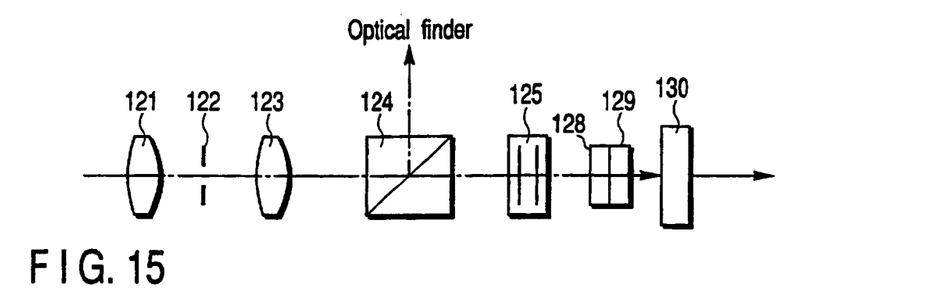
FIG. 15 is a view showing the arrangement of the optical parts of the electronic camera shown in FIG. 7.

In the electronic camera according to this embodiment, the shutter 125 is positioned away from the image sensing surface 130a of the image sensing element 130, compared to the conventional electronic camera. For example, the arrangement of the optical parts of the electronic camera 110 of this embodiment is as shown in FIG. 15. However, when these optical parts are arranged in accordance with the structure of the conventional electronic camera, the arrangement is as shown in FIG. 14. Hence, the camera is influenced by the aperture area (aperture diameter) of the stop 122 more strongly than in the conventional structure. That is, in slit shutter mode when the shutter speed is high, the exposure time of the image sensing surface largely changes in accordance with the aperture diameter of the stop 122 for the same shutter speed. This will be explained below.

Figure 13:
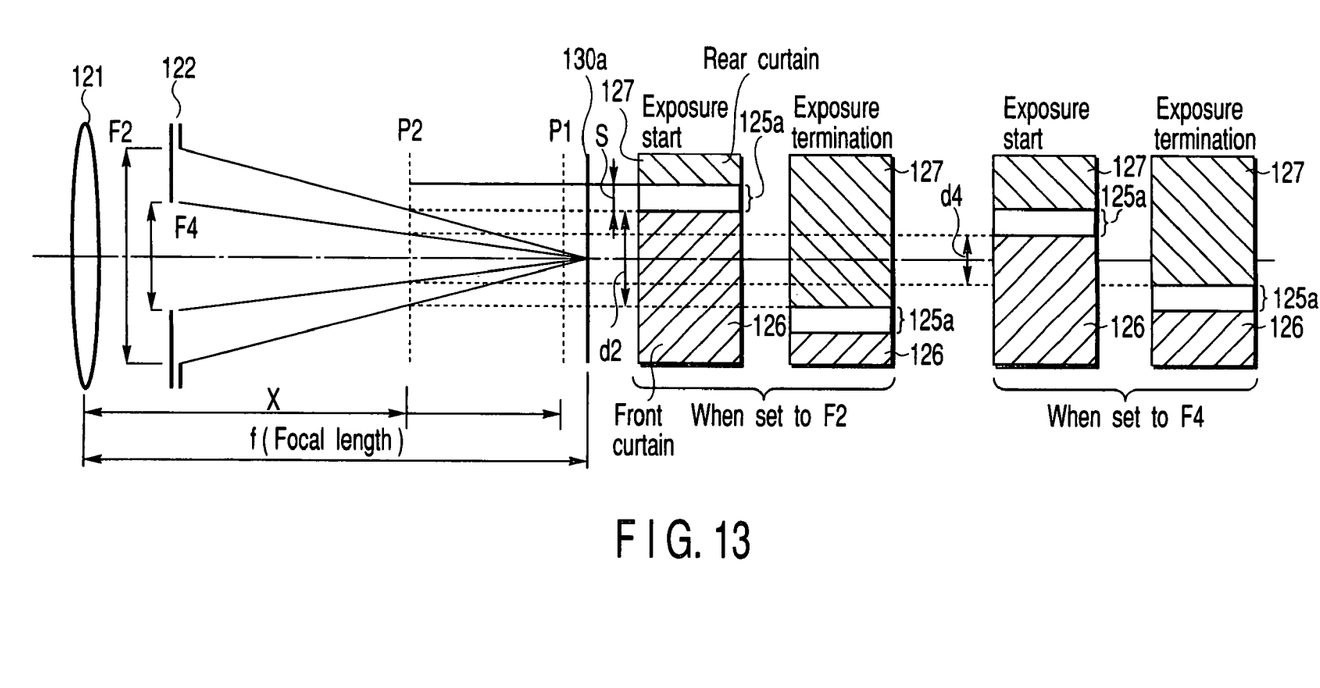
FIG. 13 is a view for explaining the relationship between the aperture diameter of a stop and the exposure time.

FIG. 13 is a view for explaining the relationship between the aperture diameter of the stop and the exposure time. Referring to FIG. 13, a position P1 closely in front of the image sensing surface 130a of the image sensing element 130 indicates the position of the shutter 125 in the conventional structure shown in FIG. 14. A position P2 away from the image sensing surface 130a indicates the position of the shutter 125 in this embodiment shown in FIG. 15.

In slit shutter mode when the shutter speed is high, an exposure time T of the image sensing surface 130a is calculated by $$T=(S+d)/v \quad (1)$$

where S is the width of the slit 125a, v is the shutter speed (the running speeds of the front and rear curtains 126 and 127, and the speeds of the two curtains are equal), and d is the diameter of a light beam at the shutter 125 (the position P1 or P2).

The diameter d of the light beam is calculated by $$d=(f-x)D/f \quad (2)$$

where f is the focal length of the zoom lens 121 (the distance from the zoom lens 121 to the image sensing surface 130a), x is the distance from the zoom lens 121 to the shutter 125 (the position P1 or P2), and D is the aperture diameter of the stop 122.

When the shutter 125 is in the position P1 closely in front of the image sensing surface 130a as in the conventional structure shown in FIG. 14, the distance x has a value close to the focal length f in equation (2), so the diameter d of the light beam at the shutter 125 has a very small value regardless of the value of the aperture diameter D of the stop 122. When this is the case, the diameter d of the light beam is much smaller than the width S of the slit 125a. Accordingly, the width S of the slit 125a and the shutter speed v are dominant as elements for determining the exposure time T. That is, this exposure time T is not largely influenced by the aperture diameter D of the stop 122.

By contrast, when the shutter 125 is in the position P2 away from the image sensing surface 130a as in the structure of this embodiment shown in FIG. 15, the value of the distance x is smaller than that of the focal length f, so the diameter d of the light beam at the shutter 125 has a relatively large value. In this case, the diameter d of the light beam has a value not small when compared to the width S of the slit 125a in equation (1). In addition, the diameter d of the light beam greatly changes in accordance with a change in the aperture diameter D of the stop 122. This increases the influence of the diameter d of the light beam as an element for determining the exposure time T. That is, the exposure time T is largely influenced by the aperture diameter D of the stop 122.

For example, the right-hand side of FIG. 13 exaggeratively indicates the relationship between diameters d2 and d4 of the light beam at the position P2 and the width S of the slit 125a when the aperture diameter of the stop 122 is set to F2 and F4. As shown in FIG. 13, if the diameters d2 and d4 of the light beam are about four and two times, respectively, the width S of the slit 125a, exposure times T2 and T4 of the image sensing surface 130a when the aperture diameter of the stop 122 is set to F2 and F4 have a ratio of 5:3 from equation (1), i.e., they are largely different from each other, even for the same shutter speed v.

To solve this problem, in the electronic camera 110 according to this embodiment, the shutter driving controller 135 controls driving of the front and rear curtains 126 and 127 in accordance with the set value of the aperture area of the stop 122 formed by the system controller 161 and with the set value of the shutter speed of the shutter 125, such that the exposure time of the image sensing surface 130a is equal to a predetermined exposure time to be obtained by the set value of the shutter speed. That is, even when the set value of the shutter speed remains the same, the shutter driving controller 135 operates the front and rear curtains 126 and 127 in different modes in accordance with the set value of the aperture area of the stop 122, thereby obtaining a predetermined exposure time. As described above, this can eliminate the problem posed when the shutter 125 is placed in the position away from the image sensing surface 130a of the image sensing element 130 compared to the conventional electronic camera.

Figure 16:
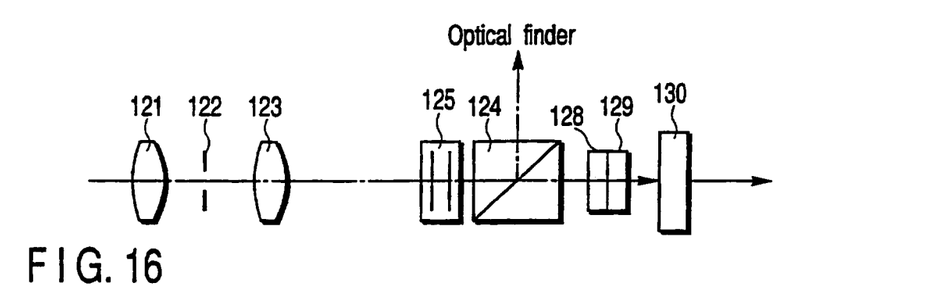
FIG. 16 is a view showing the arrangement of optical parts of an electronic camera according to still another embodiment of the present invention.
Figure 17:
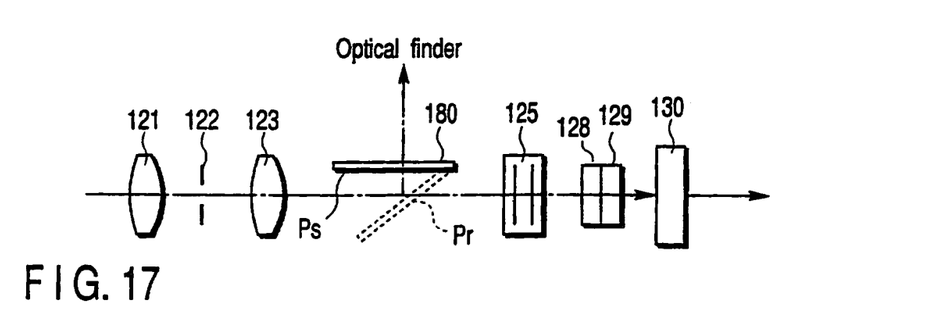
FIG. 17 is a view showing the arrangement of electronic parts of an electronic camera according to still another embodiment of the present invention.

FIGS. 16 and 17 are views showing the arrangements of optical parts of electronic cameras according to still other embodiments of the present invention.

In the embodiment shown in FIG. 16, a shutter 125 is placed closer to the incident light side than a beam splitter 124. In the embodiment shown in FIG. 17, a click return mirror (optical path switching device) 180 is disposed, instead of a beam splitter 124, as a light guiding device for forming a branched optical path to an optical finder. The beam splitter 124 can be moved between a position Pr at which the direction of a light beam passing through a photographic lens system is changed toward the optical finder and a position Ps at which this light beam is passed toward an image sensing element 130.

In the embodiments shown in FIGS. 16 and 17, the shutter 125 is similarly disposed away from the image sensing element 130 and closer to the incident light side than filters 128 and 129. Therefore, it is possible to prevent adhesion of wear dust from the focal-plane shutter 125 to the image sensing surface of the image sensing element 130, and thereby avoid deterioration of the picture quality. In these embodiments, as in the embodiment shown in FIG. 7, it is desirable to form a substantially closed space for preventing invasion of dust and the like, between the image sensing element 130 and the optical member (in this case, the filter 129) closely in front of the image sensing element 130, by using an appropriate holding frame.

In each of the above embodiments, the focal-plane shutter 125 is the shutter 125 having the front and rear curtains 126 and 127. However, the present invention is also applicable to a focal-plane shutter having only one curtain (sector) or a large number of sectors.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic camera comprising:
   a photographic lens configured to form an object image;
   an image sensing element configured to photoelectrically convert the formed object image;
   a light guiding device configured to guide incident light from an object, which is incident from the photographic lens, to a first optical path to the image sensing element and a second optical path different from the first optical path;
   an optical filter disposed between the light guiding device and the image sensing element; and
   a filter holding member which is made of an elastic material and holds the optical filter;
   wherein the filter holding member comprises:
      a first portion that surrounds and holds an outer-diameter portion of the optical filter;
      a second portion that forms a closed space between the optical filter and the light guiding device; and
      a third portion that forms a closed space between the optical filter and the image sensing element;
      wherein the second portion is connected to the first portion and intimately contacts a surface of the light guiding device that faces the optical filter, so as to surround the first optical path;
   wherein the third portion is connected to the first portion and intimately contacts a surface of the image sensing element that faces the optical filter, so as to surround the first optical path; and
   wherein the filter holding member comprises first and second members that are split with respect to each other and which are adjacent to each other along the first optical axis, wherein the first and second members include the second and third portions, respectively, and wherein the first and second members intimately contact each other.

2. The camera according to claim 1, wherein the optical filter and the light guiding device are assembled against an elasticity of the filter holding member, such that the second portion of the filter holding member intimately contacts the light guiding device.

3. The camera according to claim 1, wherein the light guiding device comprises a light splitting device configured to split the incident light to the first and second optical paths.

4. The camera according to claim 3, wherein the light splitting device comprises a beam splitter.

5. The camera according to claim 1, further comprising:
   an optical member disposed on the second optical path in a vicinity of the light guiding device; and
   an elastic member configured to form a closed space between the optical member and the light guiding device;
   wherein the elastic member intimately contacts opposing surfaces of the optical member and the light guiding device and surrounds a space between the opposing surfaces so as to surround the second optical path.

* * * * *